(12) United States Patent
Hwang et al.

(10) Patent No.: US 7,451,364 B2
(45) Date of Patent: Nov. 11, 2008

(54) METHOD AND APPARATUS FOR MANAGING DISC DEFECTS USING UPDATEABLE DMA, AND DISC THEREOF

(75) Inventors: Sung-Hee Hwang, Gangnam-gu (KR); Jung-Wan Ko, Suwon-si (KR); Kyung-Geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 10/529,691

(22) PCT Filed: Oct. 14, 2003

(86) PCT No.: PCT/KR03/02121

§ 371 (c)(1),
(2), (4) Date: Mar. 29, 2005

(87) PCT Pub. No.: WO2004/036562

PCT Pub. Date: Apr. 29, 2004

(65) Prior Publication Data

US 2006/0242479 A1    Oct. 26, 2006

(30) Foreign Application Priority Data

Oct. 18, 2002 (KR) .................. 10-2002-0063851
Dec. 13, 2002 (KR) .................. 10-2002-0079754

(51) Int. Cl.
*G11C 29/00* (2006.01)

(52) U.S. Cl. ........................ 714/710; 714/54

(58) Field of Classification Search ................. 707/205; 369/47.14, 53.1; 714/8, 723, 710, 54
See application file for complete search history.

(56) References Cited

U.S. PATENT DOCUMENTS 5,448,728 A * 9/1995 Takano et al. ............... 707/205

(Continued)

FOREIGN PATENT DOCUMENTS

CN          1274462 A       11/2000

(Continued)

OTHER PUBLICATIONS

Office Action issued in Chinese Patent Application No. 200380101600.7 on Aug. 4, 2006.

*Primary Examiner*—David Ton
(74) *Attorney, Agent, or Firm*—Stein, McEwen & Bui, LLP

(57) ABSTRACT

A disc defect management method and apparatus using a defect management area that can be updated, and a write once disc incorporating the method. A data area is disposed between a lead-in area and a lead-out area. The disc includes a defect management area (DMA) that is present in at least one of the lead-in area or the lead-out area, wherein defect information and defect management information are repeatedly recorded in the DMA according to a recording operation. Accordingly, the disc defect management method and apparatus enable effective use of the defect management area. The method is also applicable to a multi layer disc having a user data area on each layer. The defect information and the defect management information for an individual defect may include cumulative defect information and defect management information related to previously identified defects.

9 Claims, 12 Drawing Sheets

U.S. PATENT DOCUMENTS

| | | |
|---|---|---|
| 5,533,031 A | 7/1996 | Dounn et al. |
| 6,198,709 B1 | 3/2001 | Shirane |
| 6,341,109 B1 * | 1/2002 | Kayanuma ............... 369/47.14 |
| 6,377,526 B1 * | 4/2002 | Vining et al. ............. 369/53.1 |
| 6,662,309 B2 * | 12/2003 | Ando et al. .................... 714/8 |
| 6,754,860 B2 * | 6/2004 | Kim et al. ................... 714/723 |
| 6,782,488 B1 | 8/2004 | Park et al. |
| 6,963,523 B1 * | 11/2005 | Park ........................ 369/47.14 |

FOREIGN PATENT DOCUMENTS

| | | |
|---|---|---|
| JP | 2000-173056 | 6/2000 |
| JP | 2000-268511 | 9/2000 |
| KR | 1999-75796 | 10/1999 |
| KR | 2002-0057729 A | 7/2002 |
| WO | WO 00/07185 | 2/2000 |

* cited by examiner

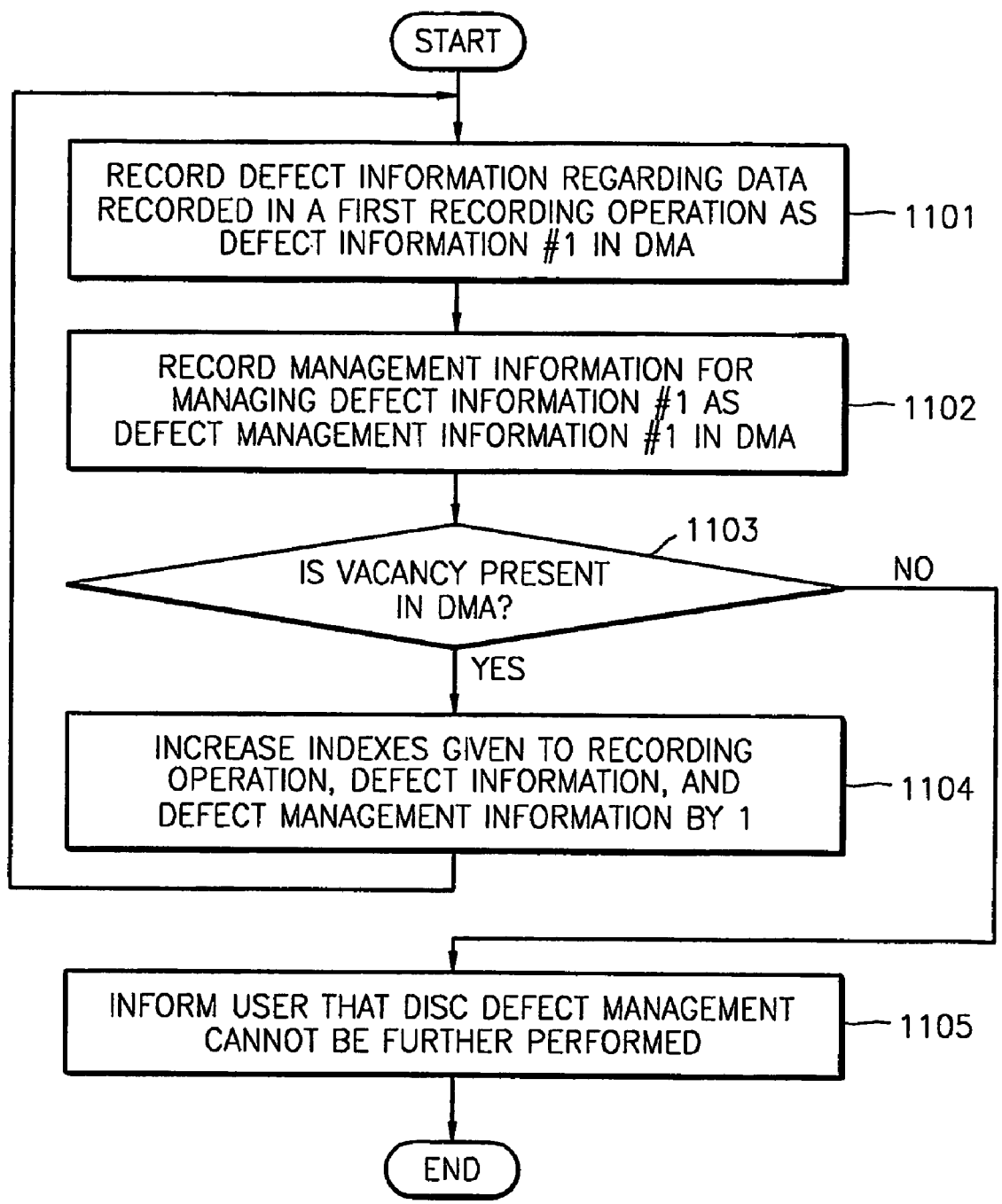

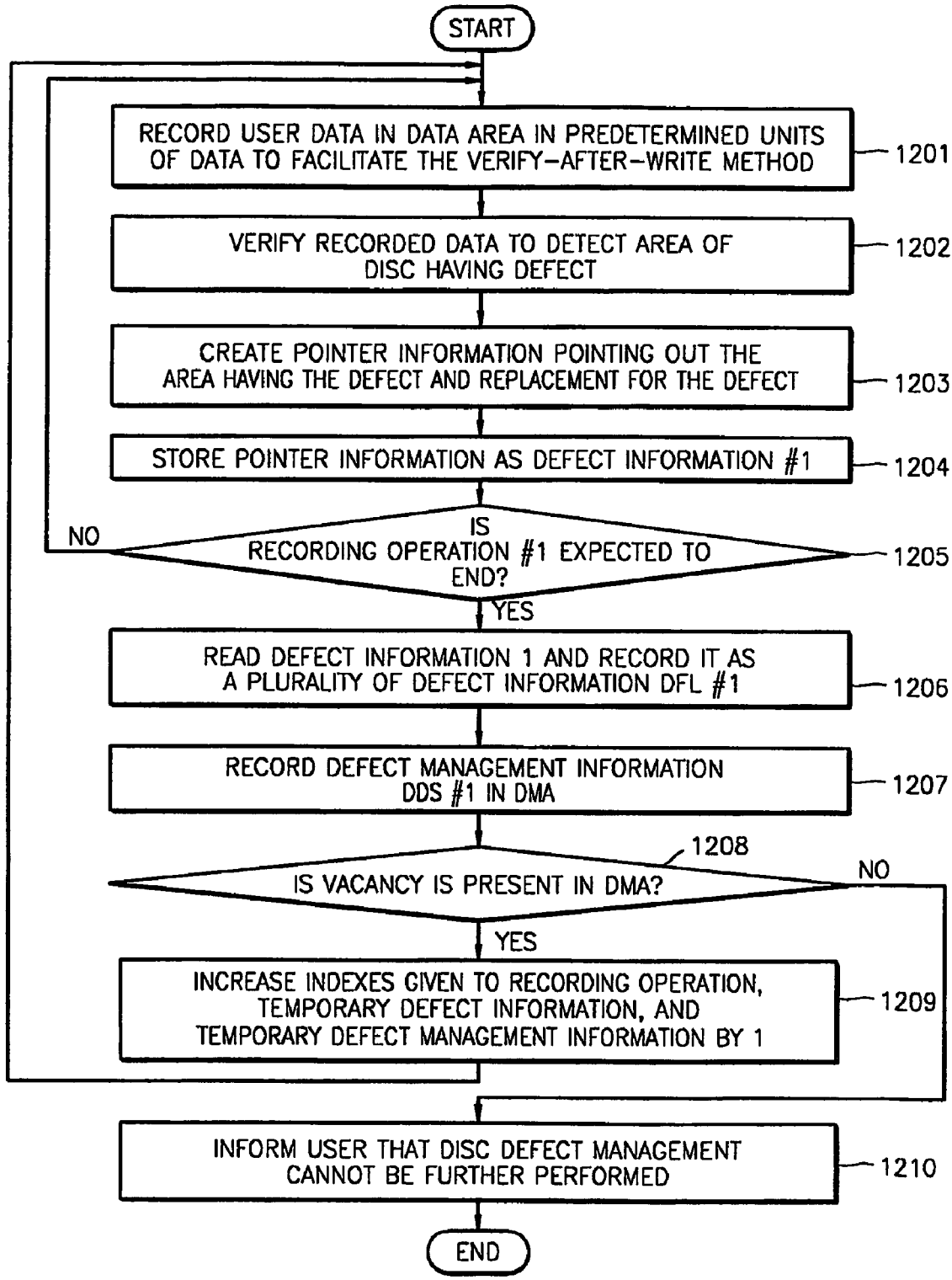

METHOD AND APPARATUS FOR MANAGING DISC DEFECTS USING UPDATEABLE DMA, AND DISC THEREOF

CROSS REFERENCE TO RELATED APPLICATIONS

This application claims the benefit of Patent Cooperation Treaty Application No. PCT/KR2003/002121 filed Oct. 14, 2003 in the Korean Intellectual Property Office, which claims priority to Korean Patent Application Nos. 2002-63851 filed on Oct. 18, 2002, and 2002-79754 filed on Dec. 13, 2002 in the Korean Intellectual Property Office, the disclosures of which are incorporated herein by reference.

BACKGROUND OF THE INVENTION

1. Field of the Invention

The present invention relates to disc defect management, and more particularly, to a method of and an apparatus for managing disc defects using a defect management area (DMA) that can be updated, and a disc therefor.

2. Description of the Related Art_Defect management is a process of rewriting data stored in a user data area of a disc in which a defect exists. The data is rewritten to a new portion of the disc's data area, thereby compensating for the data loss caused by the defect. In general, defect management is performed using linear replacement or slipping replacement. In linear replacement, the user data area in which a defect exists is replaced with a spare data area having no defects. In slipping replacement, the user data area with the defect is marked, and data recording is slipped to a next user data area having no defects.

Both linear replacement and slipping replacement are applicable only to discs such as a DVD-RAM/RW, on which data can be repeatedly recorded and recording can be performed using a random access method. In other words, linear replacement and slipping replacement are difficult to apply to write once discs on which recording is allowed only once. In general, the presence of defects in a disc is detected by recording data on the disc and confirming whether or not data has been recorded correctly on the disc. However, once data is recorded on a write once disc, it is impossible to overwrite new data and manage defects therein.

After the development of CD-R and DVD-R, a high-density write once disc with a recording capacity of several dozen GBs was introduced. This type of disc can be used as a backup disc, since it is not expensive and allows random access that enables fast reading operations. However, defect management is not available for write once discs. Therefore, a backup operation is discontinued when a defective area, i.e., an area where a defect exists, is detected during the backup operation. In general, a backup operation is performed when a system is not frequently used, e.g., at night when a system manager does not operate the system. In this case, it is more likely that a discontinued backup operation will not be completed where a defective area of a write once disc is detected.

SUMMARY OF THE INVENTION

The present invention provides a method of defect management and an apparatus that can be applied to write once discs, and a write once disc.

The present invention also provides a defect management method and apparatus that can manage disc defects even when a defect is detected during a recording operation, enabling the recording operation to continue without interruption, and a write once disc adapted to use the defect management method.

According to an aspect of the present invention, there is provided a write once disc having a single record layer in which a lead-in area, a data area, and a lead-out area are sequentially disposed, the disc comprising a defect management area (DMA) that is present in at least one of the lead-in area or the lead-out area, wherein defect information and defect management information are repeatedly recorded in the DMA according to a recording operation.

According to an aspect of the present invention, there is provided a double record layer write once disc having a first record layer in which a lead-in area, a data area, and an outer area are sequentially located and a second record layer in which an outer area, a data area, and a lead-out area are sequentially located, the disc comprising a DMA that is present in at least one of the lead-in area, the lead-out area, or the outer area, wherein defect information and defect management information are repeatedly recorded in the DMA according to a recording operation.

The defect information and the defect management information may be continuously updated and recorded until the DMA has no room for recording.

The addresses of data and replacement data, which are most recently recorded in user areas and spare areas of the record layers, respectively, may be recorded in the DMA. Also, a pointer pointing out a position of the defect information may be recorded in the DMA. The defect management information corresponding to the defect information, which is recorded per recording operation, may be recorded in the DMA.

The defect information may include state information regarding a defect, a pointer pointing out the position of the defect, and a pointer pointing out a position of replacement for the defect.

The state information may indicate whether the defect is a continuous defect block or a single defect block. The state information may specify that the defect is a continuous defect block, and corresponding pointers for the defect and the replacement may point out a start of the defect and a start of the replacement, respectively, or specify that the defect is a continuous defect block, and corresponding pointers for the defect and the replacement may point out an end of the defect and an end of the replacement, respectively.

According to an aspect of the present invention, there is provided a method of managing disc defects in a disc, comprising recording defect information regarding data, which is recorded in a data area of the disc according to a first recording operation, as a plurality of first defect information in a DMA that is present i in at least one of a lead-in area or a lead-out area of the disc; recording management information for managing the first defect information as first defect management information in the DMA; and repeating recording of the first defect information and recording of the first defect management information at least once while increasing indexes given to the recording operation, defect information, and defect management information by 1.

The repeating recording of the first defect information and recording of the first defect management information may be performed until the DMA has no room for recording.

During the recording of the first defect information, the defect information may be sequentially recorded in a defect information area included in the DMA, starting from the start of the defect information area toward its end, and during the recording of the first defect management information, the defect management information may sequentially recorded in a defect information management area included in the DMA, starting from the start of the defect information management area toward an end of the defect information management area. Alternatively, during the recording of the first defect information, the defect information may be sequentially recorded in the defect information area included in the DMA, starting from the end of the defect information area toward its start, and during the recording of the first defect management information, the defect management information may be sequentially recorded in the defect information management area included in the DMA, starting from the end of the defect information management area toward the start of the defect information management area. Alternatively, during the recording of the first defect information and the recording of the first defect management information, the corresponding defect information and defect management information may be sequentially recorded to form a pair in the defect management area, starting from the start of the defect management area, and during the recording of the first defect information and the recording of the first defect management information, the corresponding defect information and defect management information may be sequentially recorded to form a pair in the defect management area, starting from the end of the defect management area.

The recording of the first defect information may comprise recording data in predetermined units; verifying the recorded data to detect an area of the disc with a defect; storing information, which designates the area with the defect as a defective area, and information, which designates a replacement area that is replacement for the defective area, as the first defect information in memory; repeating recording of data, verifying the recorded data, and storing of the first defect information at least once; and reading the first defect information from the memory and recording the read information as the first defect information in the DMA.

A replacement area for the defective area is allotted to a spare area of the disc.

According to an aspect of the present invention, there is provided a recording apparatus comprising a recording/reading unit that records data on or reads data from a disc; and a controller that controls the recording/reading unit to repeatedly record defect information regarding data, which is recorded in a data area of the disc per recording operation, as defect information in a DMA that is present in at least one of a lead-in area or a lead-out area of the disc, and record management information for managing the defect information as defect management information in the DMA.

The controller may control the recording/reading unit to record the defect information and defect management information per recording operation in the DMA until the DMA has no room for recording, and informs a user that disc defect management cannot be further performed when the DMA has no room for recording.

According to an aspect of the present invention, there is provided a recording apparatus comprising a recording/reading unit that records data on or reads data from a disc; and a controller that controls the recording/reading unit to record defect information regarding data, which is recorded in a data area of the disc according to a first recording operation, as a plurality of first defect information in a DMA that is present in at least one of a lead-in area or a lead-out area of the disc, record management information for managing the first defect information as first defect management information in the DMA, record defect information regarding data, which is recorded in the data area according to a second recording operation, as a plurality of second defect information in the DMA, and record management information for managing the second defect information as second defect management information in the DMA.

The controller may control the recording/reading unit to record data in the data area while increasing indexes given to the recording operation, defect information, and defect management information by 1, until the DMA has no room for recording, and informs a user that disc defect management cannot be further performed when the DMA has no room for recording.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 11 is a flowchart illustrating a defect management method according to an embodiment of the present invention; and FIG. 12 is a flowchart illustrating a defect management method according to another embodiment of the present invention.

DESCRIPTION OF THE PREFERRED EMBODIMENTS

Figure 1:
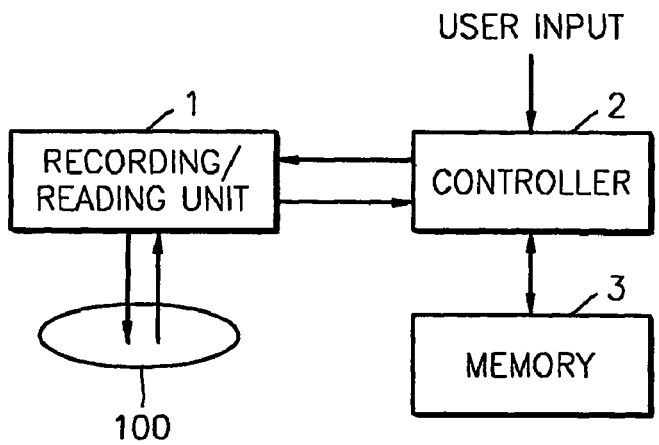
FIG. 1 is a block diagram of a recording apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a recording apparatus according to an embodiment of the present invention. Referring to FIG. 1, the recording apparatus includes a recording/reading unit 1, a controller 2, and a memory 3. The recording/reading unit 1 records data on a disc 100, which is an information storage medium according to an embodiment of the present invention, and reads back the data from the disc 100 to verify the accuracy of the recorded data. The controller 2 performs defect management according to the present invention. In the embodiment shown in FIG. 1, the controller 2 uses a verify-after-write method in which data is recorded on a disc in predetermined units of data and the accuracy of the recorded data is verified to detect a defect in the data. In other words, the controller 2 records user data on the disc 100 in units of recording operations and verifies the recorded user data to detect an area of the disc 100 in which a defect exists. Thereafter, the controller 2 creates information that indicates a position of the area having the defect and stores the created information in the memory 3. Every time that such information is created, the controller 2 stores the created information in the memory 3. If the amount of the stored information reaches to a predetermined level, the controller 2 records the stored information as defect information on the disc 100.

Here, the recording operation is a unit of work determined according to a user's intention or is a recording work to be performed. According to this embodiment, a recording operation indicates a process in which the disc 100 is loaded into the recording apparatus, data is recorded on the disc 100, and the disc 100 is taken out from the recording apparatus. During the recording operation, data is recorded and verified at least once. In general, data is recorded and verified several times. Defect information, which is obtained using the verify-after-write method, is temporarily stored in the memory 3.

When a user presses the eject button (not shown) of the recording apparatus in order to remove the disc 100 after recording of data, the controller 2 expects the recording operation to be terminated. Next, the controller 2 reads the information from the memory 3, provides the read information to the recording/reading unit 1, and controls the recording/reading unit 1 to record it on the disc 100.

The recording/reading unit 1 records the information provided from the controller 2 as defect information in a defect management area of the disc 100 and further records management information, which is used to manage the defect information, in the defect management area.

Figure 2A:
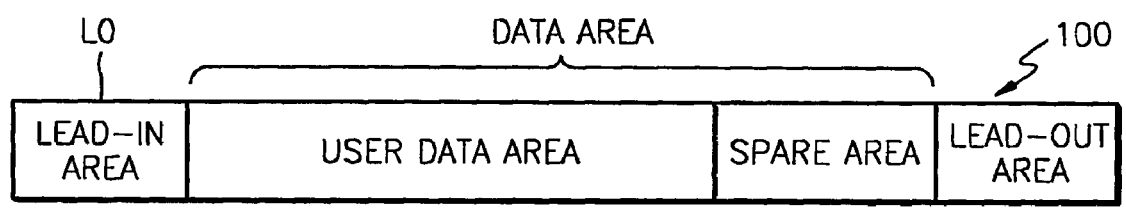
FIGS. 2A and 2B illustrate structures of a disc according to embodiments of the present invention.
Figure 2B:
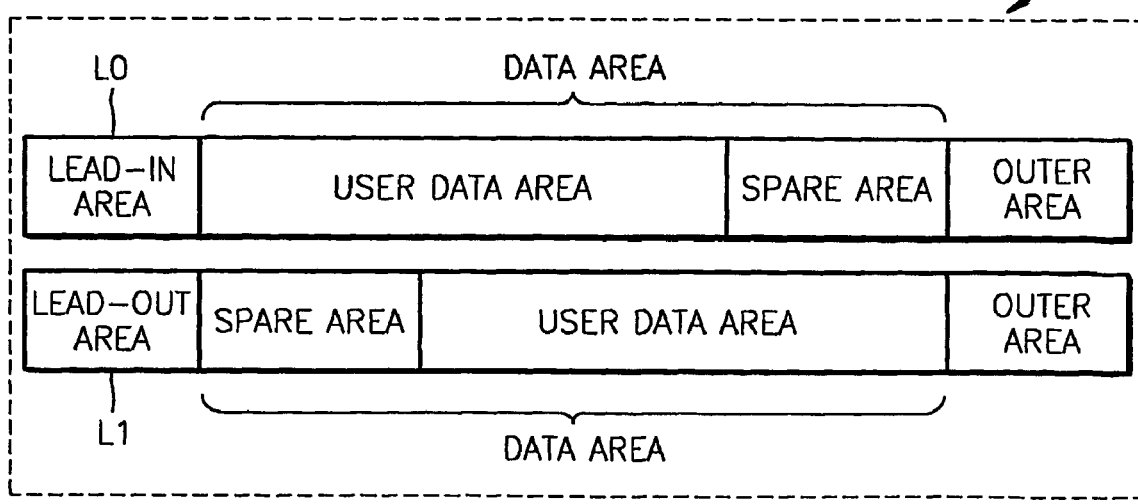

FIGS. 2A and 2B illustrate structures of the disc 100 of FIG. 1 according to embodiments of the present invention. FIG. 2A illustrates in detail a single record layer disc representation of disc 100 having a record layer L0. The disc 100 includes a lead-in area, a data area, and a lead-out area. The lead-in area is located in an inner part of the disc 100 and the lead-out area is located in an outer part of the disc 100. The data area is present between the lead-in area and the lead-out area, and divided into a user data area and a spare area.

The user data area is an area where user data is recorded, and the spare area is the replacement area for a user data area having a defect, serving to compensate for loss in the recording area due to the defect. On the assumption that defects may occur within the disc 100, the spare area may be about 5% of the entire data capacity of the disc 100, so that a greater amount of data can be recorded on the disc 100.

FIG. 2B illustrates a double record layer embodiment of the disc 100 having two record layers L0 and L1. A lead-in area, a data area, and an outer area are sequentially formed from an inner part of the first record layer L0 to an outer part of the first recording layer. Also, an outer area, a data area, and a lead-out area are sequentially formed from an outer part of the second record layer L1 to an inner part of the second recording layer. Unlike the single record layer disc of FIG. 2A, the lead-out area is present in the inner part of the disc 100 of FIG. 2B. That is, the disc 100 of FIG. 2B has an opposite track path (OTP) in which data is recorded starting from the lead-in area of the first record layer L0 toward the outer area and continuing from the outer area of the second record layer L1 to the lead-out area at the inner part of the second recording layer. A respective spare area is allotted to each of the record layers L0 and L1.

In the embodiment shown in FIG. 2B, the spare areas are present between the user data area and the lead-out area in the recording layer L1 and between the user data area and the outer area in the recording layer L1. If necessary, a portion of each user data area may be used as another spare area, that is, one or more additional spare areas may be present between the lead-in area and the lead-out area.

Figure 3A:
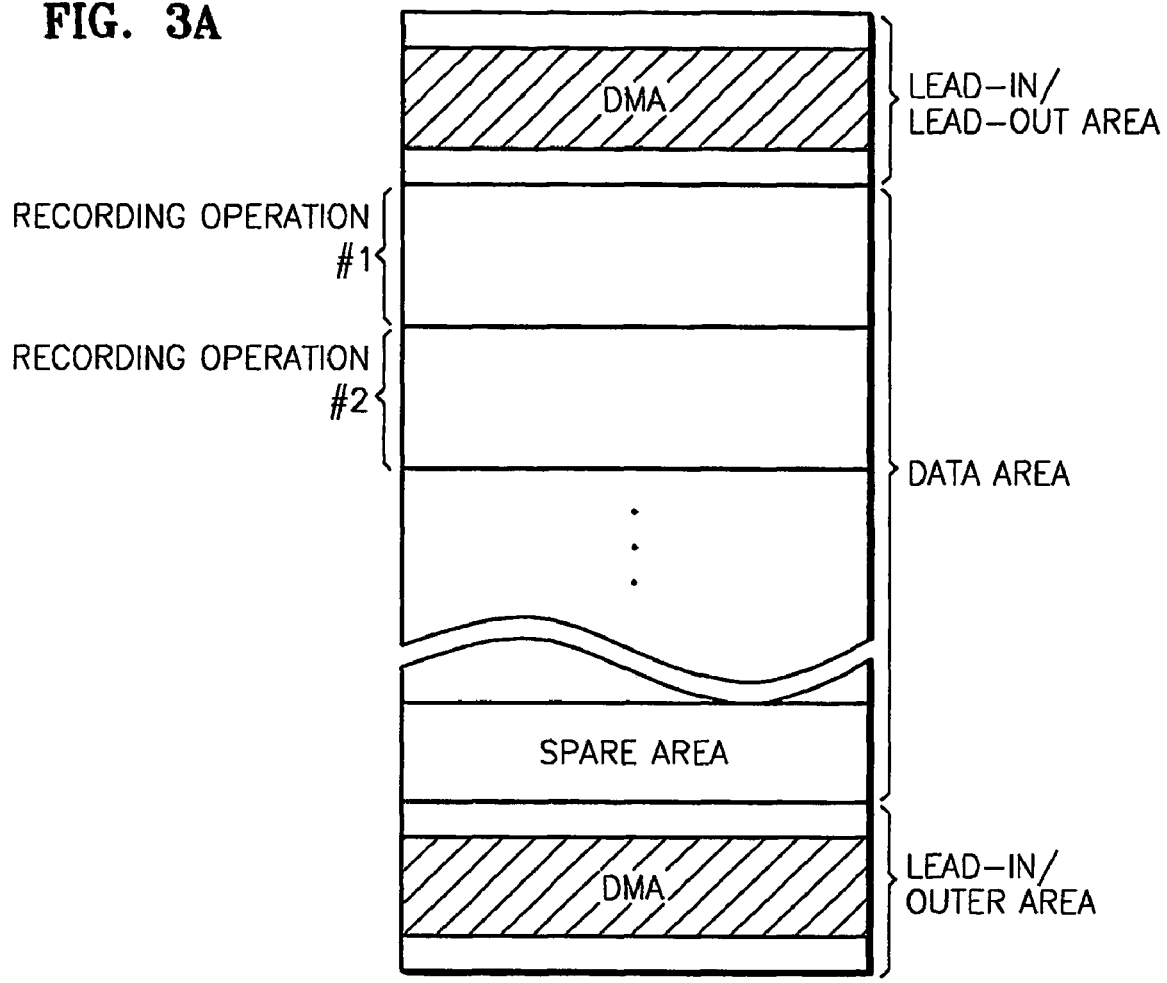
FIG. 3A illustrates data structures of the disc of FIGS. 2A and 2B according to an embodiment of the present invention.

FIG. 3A illustrates details the disc 100 according to an embodiment of the present invention. Referring to FIG. 3A, if the disc 100 is a single record layer disc as shown in FIG. 2a, a defect management area (DMA) is present in at least one of the lead-in area or the lead-out area. If the disc 100 is a double record layer disc as shown in FIG. 2B, the DMA may be present in at least one of the lead-in area, the lead-out area, or the outer area. In the case of the double record layer disc shown in FIG. 2B, the DMA may be formed in at least one of the lead-in area or the lead-out area, which are located in the inner part of the disc 100.

In general, information that relates to managing defects in the disc 100 is recorded in the DMA. Such information includes the structure of the disc 100 for defect management, the position of defect information, whether defect management is performed or not, and the position and size of a spare area. In the case of a write once disc, new data is recorded after previously recorded data when the previously recorded data changes.

In general, when a disc is loaded into a recording/reading apparatus, the apparatus reads data from a lead-in area and a lead-out area of the disc to determine how to manage the disc and record data on or read data from the disc. However, if the amount of data recorded in the lead-in area/lead-out area increases, a longer time is spent on preparing the recording or reproducing of data after the loading of the disc. To solve this problem, a DMA is determined to be an area in which recorded information can be updated in this embodiment. That is, defect information and defect management information are updated and recorded in the DMA during every recording operation. Updating defect management information and defect information reduces the amount of information that the recording/reading unit requires for a recording/reproducing operation.

Since defect management is performed using linear replacement, the defect information includes information indicating the position of an area of the disc 100 having a defect and information indicating the position of an area of the disc 100 that is replacement for the area having the defect. More preferably, the defect management information further includes information indicating whether the area having the defect is a single defect block, or a continuous defect block in which physically continuous defects exist. The defect management information is used to manage the defect information and includes information indicating the point of the disc 100 where the defect information is recorded. More specifically, the defect management information further includes information indicating the position of user data that is most recently recorded in the user data area and a replacement area that is most recently formed in a spare area. Detailed data structures of defect information and defect management information are explained below.

The defect information and defect management information are recorded every time when a recording operation ends.

In the DMA, information regarding a defect occurring in data recorded during a first recording operation and information regarding a replacement area are recorded as defect information #1, and information regarding a defect occurring in data recorded during a second recording operation and information regarding a replacement area are recorded as defect information #2. Further, information for managing defect information #1 and #2 is recorded as defect management information #1 and #2, respectively, in the DMA. That is, generally, defect information #i may be used in association with a defect #i.

In the embodiment shown in FIG. 3A, defect information #i further contains previously recorded defect information #1, #2, #3, . . . and #i-1, in addition to defect information #i. Therefore, a recording/reading unit can easily obtain defect information just by reading the most recently recorded temporary defect information #i and defect management information #i from the DMA.

In the case of a high-density disc with a recording capacity of several dozen GBs, it is desirable that a cluster is allocated to an area in which defect management information #i is recorded and four—eight clusters are allocated to an area in which defect information #i is recorded. This is because it is preferable to record new information in units of clusters to update information when a minimum physical unit of record is a cluster, although the amount of defect information #i is just several KBs. A total amount of defects allowed in a disc is preferably about 5 percent of the disc recording capacity. For instance, about four—eight clusters are required to record defect information #i, considering that information regarding a defect is about 8 bytes long and the size of a cluster is 64 KB.

The verify-after-write method may be performed on defect information #i and defect management information #i. When a defect is detected, information recorded in an area of a disc having a defect may be either recorded in a spare area using linear replacement, or recorded in an area adjacent to the area having the defect using slipping replacement.

Figure 3B:
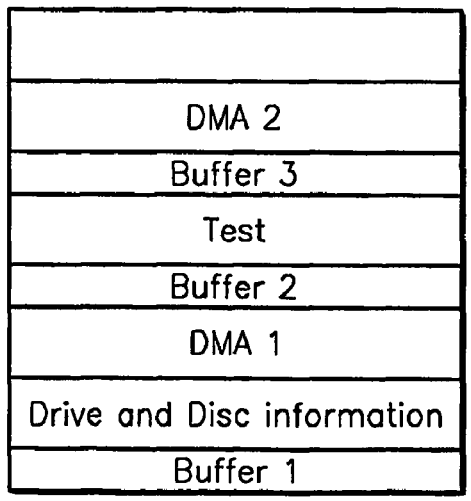
FIG. 3B illustrates an example of a disc with the defect management areas shown in FIG. 3A.

FIG. 3B illustrates an example of a disc with the defect management areas (DMAs) of FIG. 3A. If a disc is a single record layer disc as shown in FIG. 2A, the DMA is present in at least one of the lead-in area or the lead-out area of the disc. If the disc is a double record layer disc as shown in FIG. 2B, the DMA is present in at least one of the lead-in area, the lead-out area, or the outer area of the disc. Preferably, DMAs are present in the lead-in area and the lead-out area.

Referring to FIG. 3B, two DMAs are formed to increase the robustness of defect management information and defect information. In detail, a test area is an area that is used to measure recording conditions of data. A drive and disc information area contains information regarding a drive used during recording and/or reproducing operations and disc information indicating whether the disc is a single record layer disc or a double record layer disc. A first buffer area, a second buffer area, and a third buffer area act as buffers, i.e., they become borders between the other areas.

FIGS. 4A through 4D illustrate data structures of a DMA according to embodiments of the present invention.

Figure 4A:
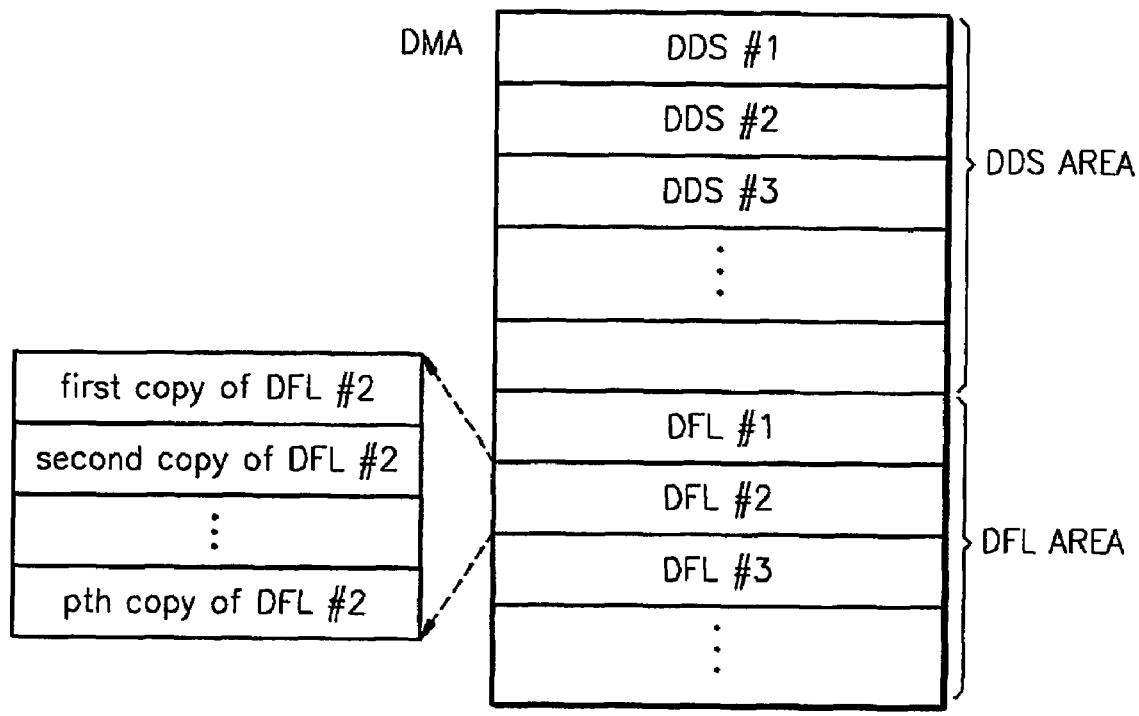
FIGS. 4A through 4D illustrate data structures of a defect management area (DMA) according to embodiments of the present invention.

Referring to FIG. 4A, a DMA is logically divided into a defect information area DFL and a defect management information area DDS. In the defect information area DFL, defect information lists DFL #1, DFL #2, DFL #3, . . . are sequentially recorded starting from the start of the defect information area DFL toward the end thereof. The defect information lists DFL #1, DFL #2, DFL #3, . . . are repeatedly recorded several times to increase the robustness of information. For example, as shown in FIG. 4A, the defect information DFL #2 is recorded P times (first copy through pth copy). Also, in the defect management information area DDS, defect management information DDS #1, DDS #2, DDS #3, . . . are sequentially recorded starting from the start of the defect management information area DDS. The defect management information DDS #1, DDS #2, and DDS #3 correspond to defect information lists DFL #1, DFL #2, and DFL #3, respectively.

Figure 4B:
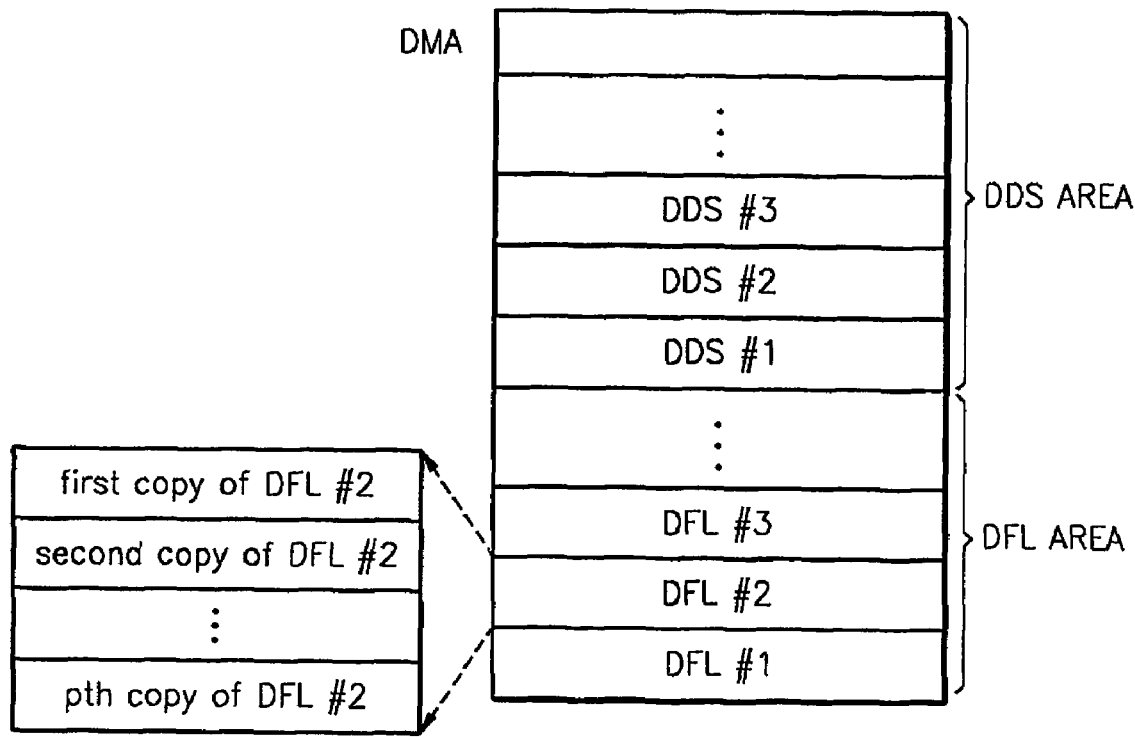

Referring to FIG. 4B, a DMA is logically divided into a defect information area DFL, and a defect management information area DDS, but the sequences of recording information are not the same as the sequences shown in FIG. 4A. More specifically, in the defect information DFL shown in FIG. 4B, defect information DFL #1, DFL #2, DFL #3, . . . are sequentially recorded starting from an end of the defect information area toward a start of the defect information area. In the defect management information area DDS, defect management information DDS #1, DDS #2, DDS #3, . . . are sequentially recorded starting from an end of the defect management information area DDS. Here, the defect management information DDS #1, DDS #2, and DDS #3 correspond to the defect information DFL #1, DFL #2, and DFL #3, respectively. Similarly, the defect information DFL #1, DFL #2, DFL #3, . . . are each recorded several times to increase the robustness of information. Referring to FIG. 4B, the defect information DFL #2 is recorded P times.

Figure 4C:
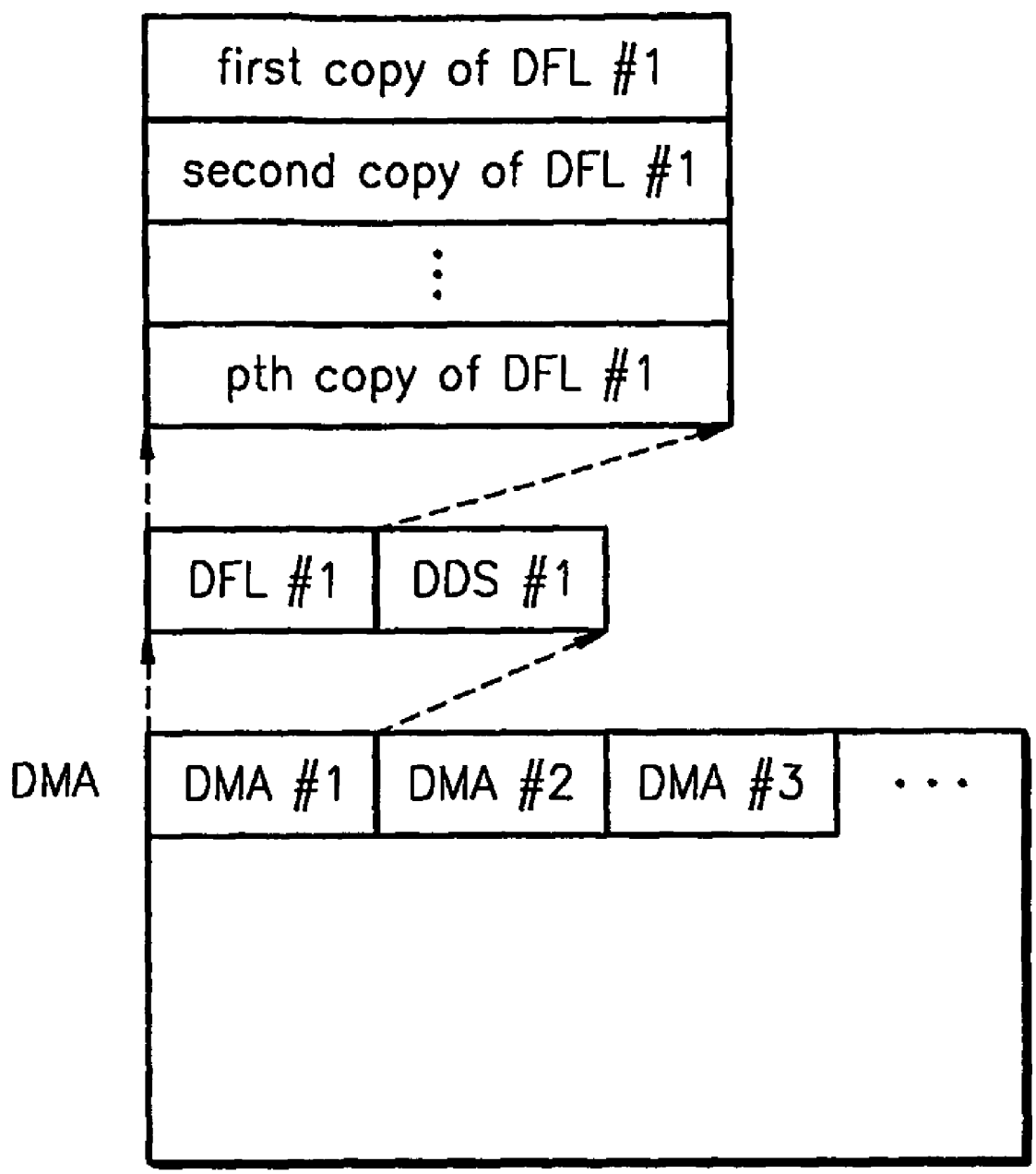

Referring to FIG. 4C, corresponding defect information and defect management information are recorded to form pairs in a DMA. In the DMA, management information DMA #1, DMA #2, DMA #3, . . . are sequentially recorded starting from the start of the DMA. The management information DMA #1 contains a pair of defect management DDS #1 and defect information DFL #1, management information DMA #2 contains a pair of defect management information DDS #2 and defect information DFL #2, and DMA #3 contains a pair of defect management information DDS #3 and defect information DFL #3. Likewise, the defect information DFL #1, DFL #2, and DFL #3, . . . are repeatedly recorded several times to increase the robustness of information. FIG. 4C illustrates repetitive recording of the defect information DFL #1 P times.

Figure 4D:
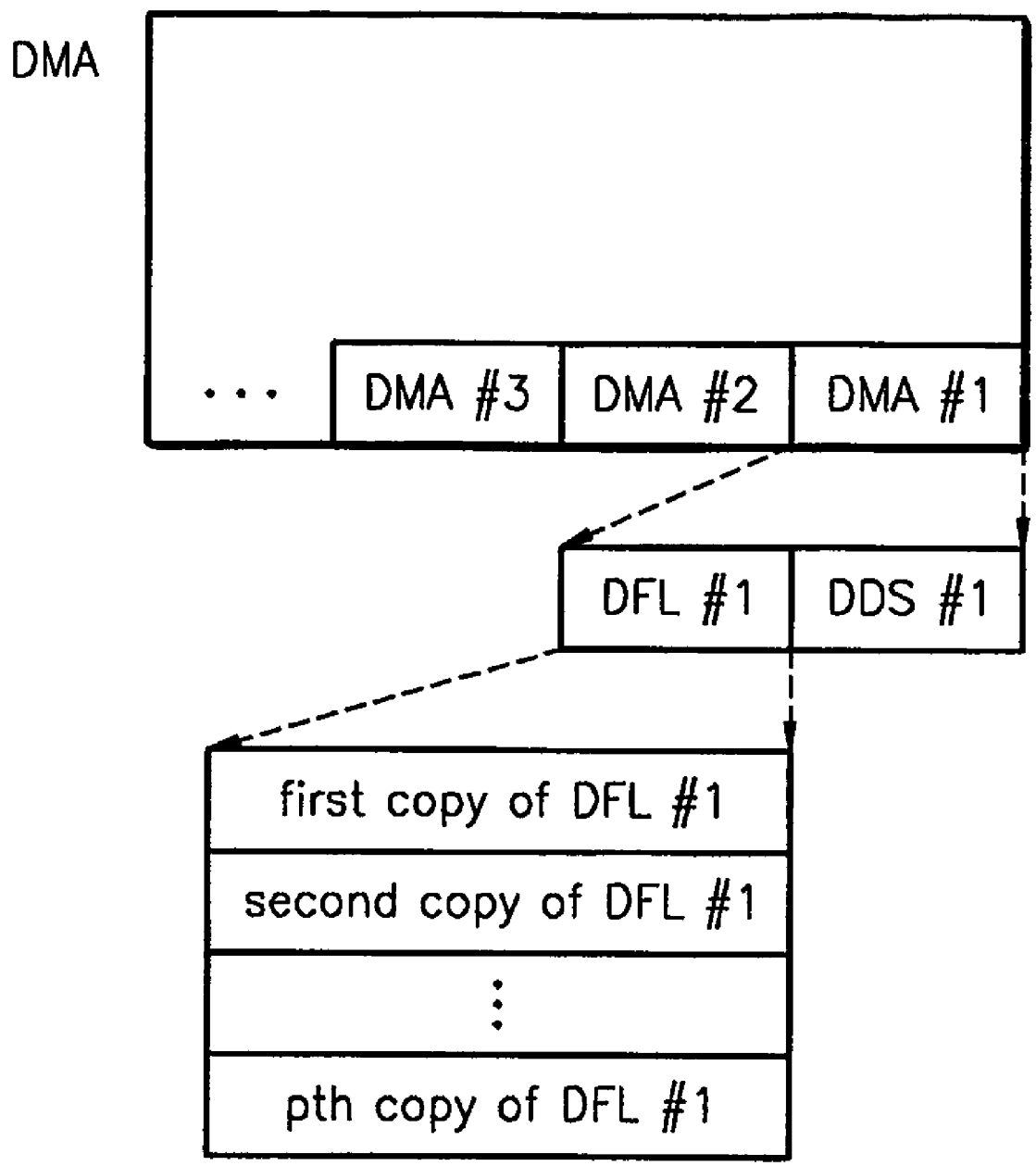

Referring to FIG. 4D, corresponding defect information and defect management information are recorded to make pairs in a DMA but the sequence of recording the information is not the same as shown in FIG. 4C. More specifically, in the DMA shown in FIG. 4D, management information DMA #1, DMA #2, DMA #3, . . . are sequentially recorded starting from the end of the DMA. The management information DMA #1 contains a pair of defect management information DDS #1 and defect information DFL #1, the management information DMA #2 contains a pair of defect management information DDS #2 and defect information DFL #2, the management information DMA #3 contains a pair of defect management information DDS #3 and defect information DFL #3. Similarly, the defect information DFL #1, DFL #2, DFL #3, . . . are repeatedly recorded several times to increase the robustness of information. In particular, FIG. 4D illustrates repetitive recording of the defect information DFL #1 P times.

Figure 5A:
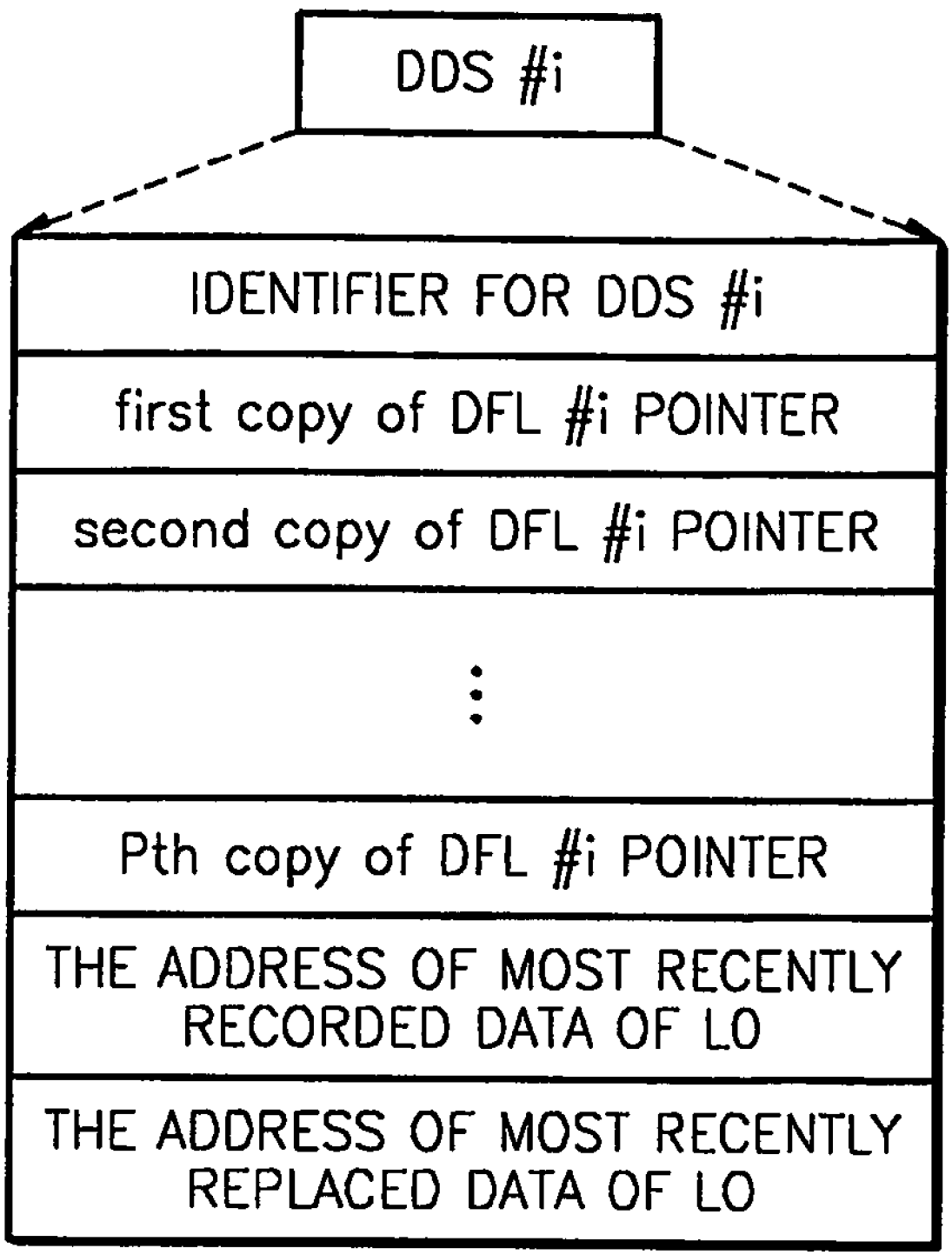
FIGS. 5A and 5B illustrate data structures of defect management information DDS #i according to embodiments of the present invention.

FIG. 5A illustrates a data structure of defect management information DDS #i recorded on a single record layer disc. Referring to FIG. 5A, the defect management information DDS #i contains an identifier for the DDS #i and information indicating a position of corresponding defect information DFL #i (DFL # i pointer). As previously mentioned related to FIGS. 4A through 4D, the defect information DFL #i according to the present invention is repeatedly recorded several times, and therefore, the information indicating the position of the defect information DFL #i includes pointers that point out the positions of the repeatedly recorded defect information DFL #i. Referring to FIG. 5A, since the defect information DFL #i is recorded P times, the defect management information DDS #i includes P pointers pointing out the positions of the defect information DFL #i.

Further, the defect management information DDS #i, which is recorded in a single record layer disc, contains the address of a record layer L0, which is most recently recorded in a user data area, and the address of replacement data for the record layer L0, which is most recently recorded in a spare area. In this way, a reproducing apparatus can easily reproduce the disc just by referring to the most recently recorded information. A detailed description thereof will be described below.

Figure 5B:
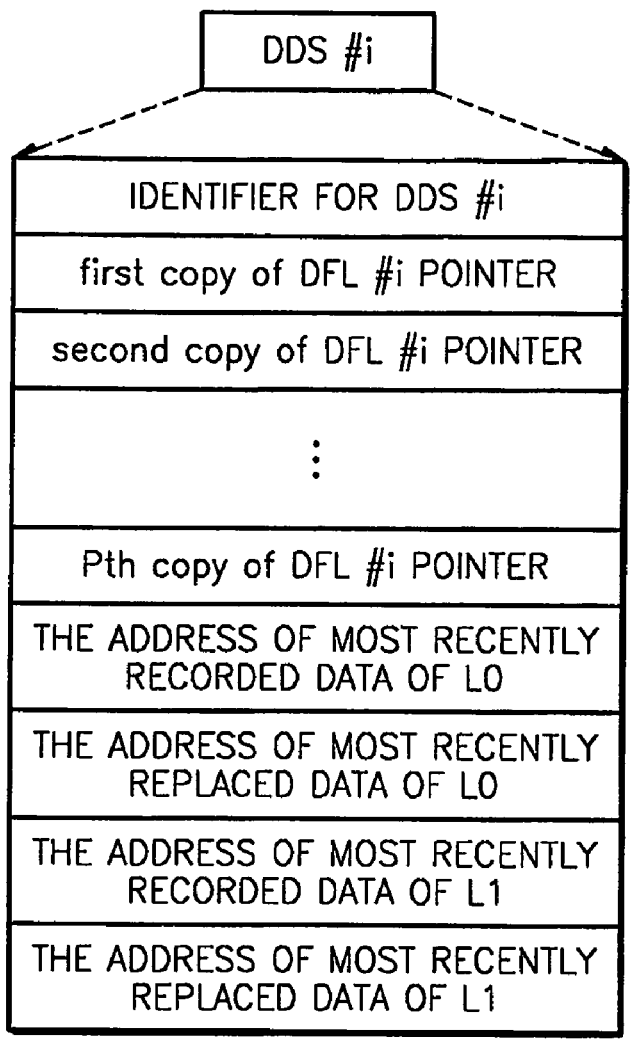

FIG. 5B illustrates a data structure of defect management information DDS #i recorded on a double record layer disc. The defect management information DDS #i includes an identifier thereof and information regarding the position of corresponding defect information DFL #i. As previously mentioned with reference to FIGS. 4A through 4D, the defect information DFL #i according to the present invention is repeatedly recorded several times, and therefore, the information regarding the position of the defect information DFL #i contains pointers pointing out the positions of the repeatedly recorded defect information DFL #i. As shown in FIG. 5B, since the defect information DFL #i is recorded P times, P pointers are included in the defect management information DDS #i.

Also, the defect management information DDS #i, which is recorded in a double record layer disc, contains the address of a first record layer L0, which is most recently recorded in a user data area, the address of replacement for the first record layer L0, which is most recently recorded in a spare area, the address of a second record layer L1, which is most recently recorded in the user data area, and the address of replacement for the second record layer L1, which is most recently recorded in the spare area. In this way, a reproducing apparatus can easily reproduce the disc just by referring to the most recently recorded information. A detailed description thereof will be described below.

Figure 6:
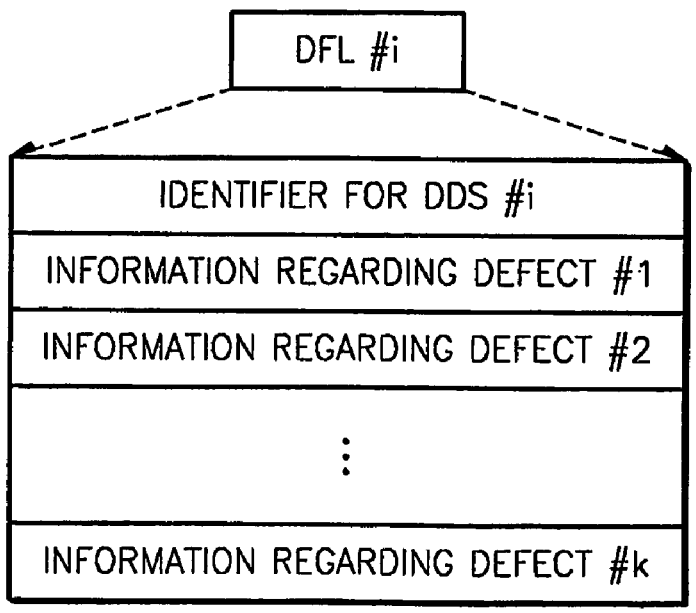
FIG. 6 illustrates a data structure of defect information DFL #i according to an embodiment of the present invention.

FIG. 6 illustrates a data structure of defect information DFL #i. Referring to FIG. 6B, defect information DFL #i contains an identifier thereof, and information regarding defect #1, defect #2, . . . , and defect #K (K is an integer). Each of the information regarding defect #1, defect #2, . . . , and defect #K provides state information indicating the position of the defect, the position of replacement for the defect, and whether an area having the defect is a single defect block or a continuous defect block. A detailed description of the data structure will be described below.

Figure 7:
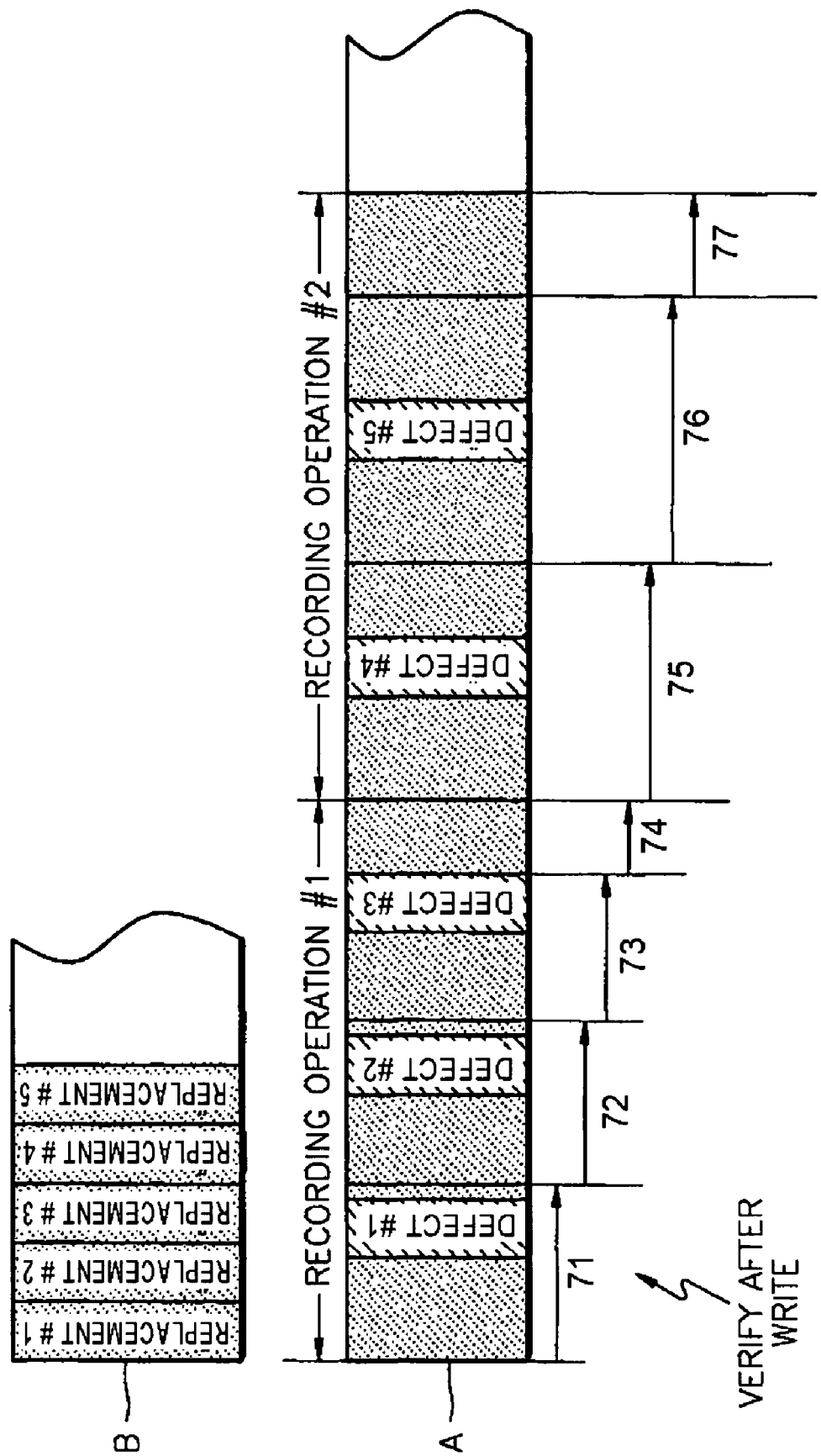
FIG. 7 is a diagram for explaining recording of data in a user data area A and a spare area B, according to an embodiment of the present invention.

FIG. 7 illustrates recording of data in a user data area A and a spare area B according to an embodiment of the present invention.

Data can be processed in units of sectors or clusters. A sector denotes a minimum unit of data that can be managed in a file system of a computer or in an application, and a cluster denotes a minimum unit of data that can be physically recorded on a disc at once. In general, one or more sectors constitute a cluster.

There are two types of sectors: a physical sector and a logical sector. The physical sector is an area on a disc where a sector of data is to be recorded. An address for detecting the physical sector is called a physical sector number (PSN). The logical sector is a unit in which data can be managed in a file system or an application. An address for detecting the logical sector is called a logical sector number (LSN). A disc recording/reading apparatus detects the recording position of data using a PSN. When recording data on a disc, the entire data is managed in units of LSNs in a computer or in an application and the position of data is detected using an LSN. The relationship between an LSN and a PSN is changed by a controller of the recording/reading apparatus, based on whether the disc contains a defect and an initial position of recording data.

Referring to FIG. 7, A denotes a user data area and B denotes a spare area in which PSNs are allocated to a plurality of sectors (not shown) in ascending order. In general, each LSN corresponds to at least one PSN. However, since LSNs are allocated to non-defective areas, including replacement areas of the spare area B, in ascending order, the correspondence between the PSNs and the LSNs is not maintained when a disc has a defective area, even if the size of a physical sector is the same as that of a logical sector.

In the data area A, sections 71 through 77 denote predetermined units of data in which the verify-after-write method is performed. A recording apparatus records user data in the section 71, returns to the start of the section 71, and checks if the user data is appropriately recorded or a defect exists in the section 71. If a defect is detected in a portion of the section 71, the portion is designated as defect #1. The user data recorded in the defect #1 is also rewritten to a portion of the spare area B. Here, the portion of the spare area B in which data recorded in the defect #1 is rewritten is called replacement #1. Next, the recording apparatus records user data in section 72, returns to the start of the section 72, and checks whether the data is properly recorded or a defect exists in the section 72. If a defect is detected in a portion of the section 72, the portion is designated as defect #2. Likewise, a replacement #2 corresponding to the defect #2 is formed in the spare area B. Further, defect #3 and replacement #3 are designated in section 73 of the user data area A and the spare area B, respectively. In section 74, a defect does not exist and a defective area is not designated.

The recording apparatus records information regarding the defects #1, #2, and #3 designated in the sections 71 through 74 as a defect information list DFL #1 in the DMA when recording operation #1 is expected to end, after recording and verifying to the section 74, i.e., when a user presses the eject button of a recording apparatus or recording of user data allocated in a recording operation is complete. Also, defect management information for managing the defect information list DFL #1 is recorded as defect management information DDS #1 in the DMA.

When a second recording operation starts, data is recorded in sections 75 through 77, and defects #4 and #5 and replacements #4 and #5 are formed in the user data area A and the spare area B in the DMA, respectively, as performed in the section 71. Defect #5 is a continuous defect block in which defects occur continuously, whereas the defects #1, #2, #3, and #4 are single defect blocks, each block in which a defect occurs. The replacement #5 is a continuous replacement block that is the replacement for the defect #5. Here, a block refers to a physical or logical unit of data in which data is recorded. If the second recording operation is expected to end, the recording apparatus records information regarding the defects #4 and #5 as defect information DFL #2, and records the information contained in the defect information DFL #1 once again. Thereafter, defect management information for managing the defect information DFL #2 is recorded in the DMA.

Figure 8:
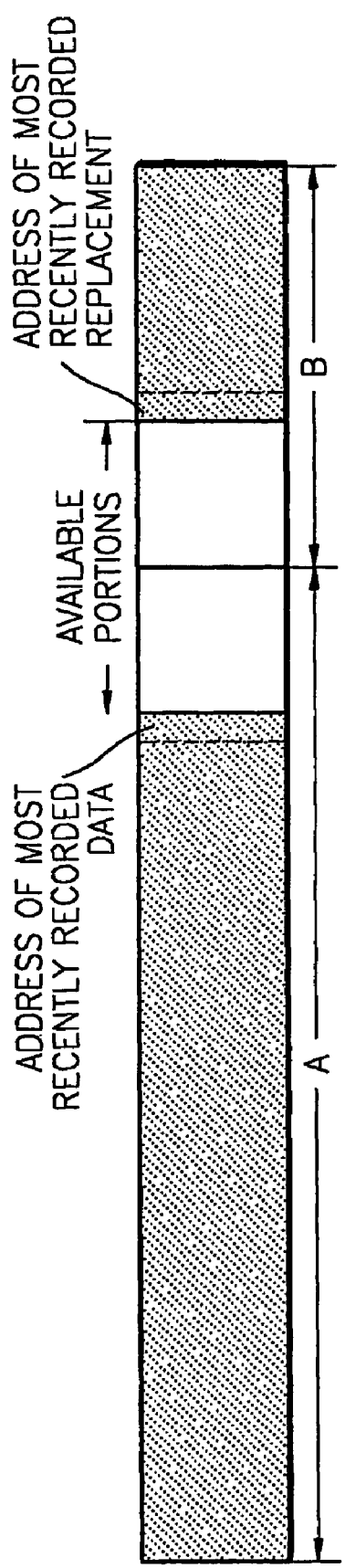
FIG. 8 is a diagram illustrating effective use of a data area according to the present invention.

FIG. 8 is a diagram illustrating effective use of a data area according to an embodiment of the present invention. Referring to FIG. 8, it is easy to detect an available portion of the data area, using the address of user data that is most recently recorded in a user data area and the address of data in a spare area that is a replacement for a defect. In particular, the available portion can be more easily detected, when the user data is recorded from the inner part or outer part of the user data area to the outer part or inner part, respectively, and the data, which is replacement for the detect, is recorded from the outer part or inner part of the spare area to the inner part or outer part, respectively. In other word, the user data and the data for replacement are preferably recorded in an opposite recording direction.

The data, which is most recently recorded in the user data areas of record layers L0 and L1, has a physical address with the largest number when physical addresses of user data are increased from the inner part of the record layer L0 to the outer part and increased from the outer part of the record layer L1 to the inner part. In contrast, the most recently recorded replacement has a physical address with the smallest number when physical addresses of replacements are reduced from the outer part to the inner part in a spare area of the record layer L0 and increased from the inner part to the outer part in a spare area of the record layer L1.

Accordingly, as previously mentioned, if the addresses of the most recently recorded data and replacement are included in defect management information DDS #i, it is possible to detect the positions of data and replacement to be newly recorded without completely reading defect information DFL #i and calculating the positions of defects. Further, available portions of the user data area and the spare area are located physically and continuously, thereby enabling effective use of the user area.

Figure 9A:
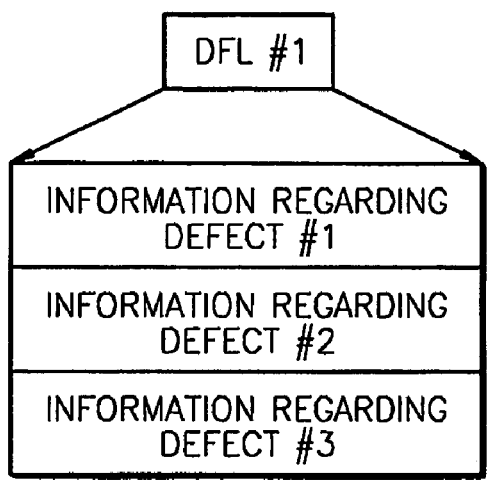
FIGS. 9A and 9B illustrate data structures of defect information DFL #1 and DFL #2 recorded according to the recording of data shown in FIG. 7.
Figure 9B:
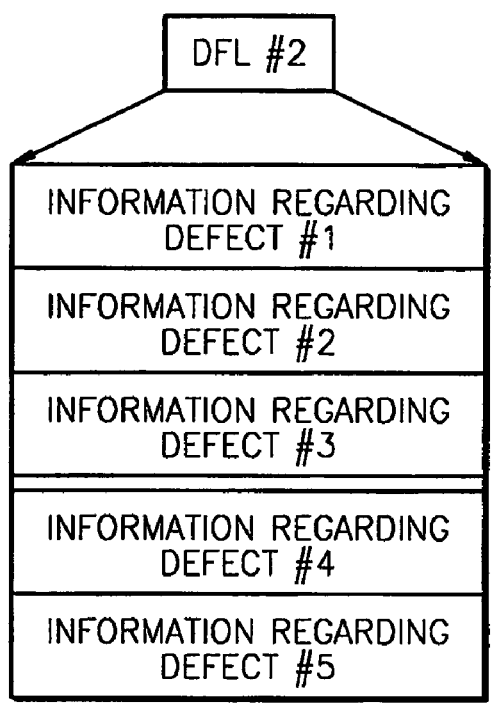
Figure 10:
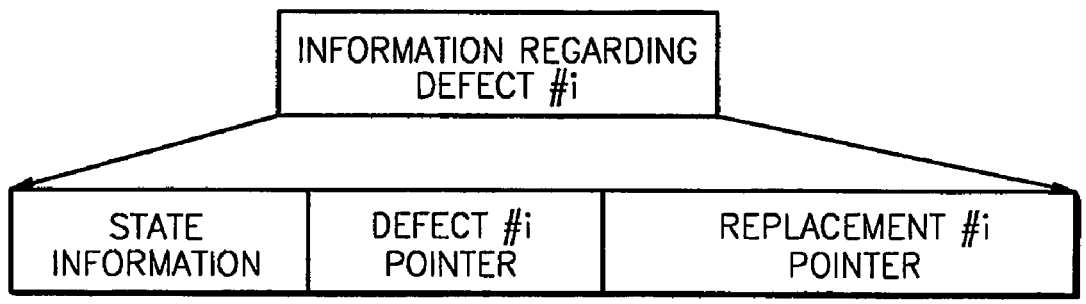
FIG. 10 illustrates a data structure of information regarding defect #i.

FIG. 9 illustrates data structures of defect information DFL #1 and DFL #2 recorded as explained with respect to FIG. 7. FIG. 10 illustrates a data structure of information regarding defect #i recorded as explained with reference to FIG. 7.

Referring to FIG. 9, the defect information DFL #1 contains information regarding defects #1, #2, and #3. The information regarding defect #1 indicates the position of an area in which defect #1 exists and the position of an area in which replacement #1 is recorded. The information regarding defect #1 may further include information indicating whether defect #1 is a continuous defect block or a single defect block. Likewise, the information regarding defect #2 indicates whether defect #2 is a continuous defect block or a single defect block, the position of an area in which defect #2 exists. and the position of an area in which replacement #2 is recorded. The information regarding defect #3 indicates whether defect #3 is a continuous defect block or a single defect block, the position of an area in which defect #3 exists, and the position of an area in which replacement #3 is recorded.

The defect information DFL #2 further contains information regarding defects #4 and #5 in addition to the information contained in the defect information DFL #1. That is, the defect information DFL #2 includes the information regarding defect #1, the information regarding defect #2, the information regarding defect #3, the information regarding defect #4, and the information regarding defect #5.

Referring to FIG. 10, the information regarding defect #i includes state information indicating whether defect #i is a continuous defect block or a single defect block, a pointer pointing out defect #i, and a pointer pointing out replacement #i. If the state information indicates that defect #i is a continuous defect block, the state information describes whether the pointer for defect #i points out the start of the continuous defect block or the end thereof and whether the pointer for replacement #i points out the start of the continuous defect block or the end thereof. If the state information describes the pointer for defect #i as the start of the continuous defect block, the pointer for defect #i is a starting physical sector number (PSN) of the continuous defect block and the pointer for replacement #i is a starting PSN of replacement #i. On the contrary, when the state information describes the pointer for defect #i as the end of the continuous defect block, the pointer for defect #i is an ending physical sector number (PSN) of the continuous defect block and the pointer for replacement #i is an ending PSN of replacement #i. The definition of a continuous defect block using state information enables effective recording of information and saves recording space, although information regarding defects is recorded in units of blocks.

The pointer for defect #i specifies a starting and/or an ending point of defect #i. For instance, the pointer for defect #i may include a starting PSN of defect #i. The pointer for replacement #i specifies a starting and/or ending points of replacement #i. For example, the pointer for replacement #i may include a starting PSN of replacement #i.

Hereinafter, a disc defect management method according to an embodiment of the present invention will be described with reference to the accompanying drawings.

FIG. 11 is a flowchart illustrating a disc defect management method according to an embodiment of the present invention. Referring to FIG. 11, in action 1101, a recording apparatus records defect information regarding data recorded according to a first recording operation as defect information #1 in a DMA, so as to manage disc defects. In action 1102, management information for managing defect information #1 is recorded as defect management information #1 in the DMA.

In action 1103, whether a vacancy is present in the DMA is checked. If it is determined in action 1103 that the vacancy is present, actions 1101 and 1102 are repeated while indexes given to a recording operation, defect information, and defect management information are increased by 1, in action 1104. However, if it is determined in action 1103 that the vacancy is not present, a user is informed that disc defect management cannot be further performed in action 1105.

FIG. 12 is a flowchart illustrating a disc defect management method according to another embodiment of the present invention. Referring to FIG. 12, user data is recorded in a data area of a disc in units of data to facilitate the verify-after-write method in action 1201. In action 1202, the data recorded in action 1201 is verified to detect an area of the disc having the defect. In action 1203, the controller 2 of FIG. 1 designates the area having the defect as a defective area, controls the recording/reading unit 1 to rewrite data recorded in the defective area to a spare area so as to create a replacement area, and creates pointer information that points out the positions of the defective area and the replacement area. In action 1204, the pointer information is stored as defect information #1. In action 1205, it is checked whether the first recording operation is expected to end. If it is determined in action 1205 that the first recording operation is not expected to end, actions 1201 through 1204 are repeated.

In action 1206, if it is determined in action 1205 that the first recording operation is likely to end, i.e., when the recording of the user data is complete by user input or according to the first recording operation, the stored defect information #1 is read and recorded as defect information DFL #1 in the DMA. In action 1207, management information for managing the defect information DFL #1 is recorded as defect management information DDS #1 in the DMA. In action 1208, whether a vacancy is present in the DMA is checked. If it is determined in action 1208 that the vacancy is present, actions 1201 through 1207 are repeated while increasing indexes given to a recording operation, defect information DFL, defect management information DDS by 1, in action 1209. If it is determined in action 1208 that the vacancy is not present, a user is informed that disc defect management cannot be further performed in action 1210.

As described above, the present invention provides a disc defect management method that is applicable to write once discs. According to the present invention, disc defect management is performed such that defect information and management information for managing the same are updated and recorded in a defect management area (DMA), thereby enabling effective use of the DMA. Accordingly, user data is recorded even on write once discs while managing disc defects therein, thereby performing backup operations more stably without interruptions.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A write once disc having at least one record layer in which a lead-in area, and a data area are disposed, the disc comprising a defect management area (DMA) that is present in the lead-in area,
    wherein defect information and defect management information are repeatedly recorded in the DMA.

2. The disc of claim 1, wherein a plurality of the DMAs are present.

3. The disc of claim 1, wherein:
    the data area comprises a user data area and a spare area; and
    an address of data that is most recently recorded in the user area of the record layer and an address of replacement data that is most recently recorded in the spare area of the record layer are recorded in the DMA.

4. The disc of claim 1, wherein a pointer pointing out a position of the defect information is recorded in the DMA.

5. The disc of claim 1, wherein the defect information for a defect contains state information specifying a state of the defect, a pointer pointing out a position of the defect, and a pointer pointing out a position of a replacement for the defect.

6. The disc of claim 5, wherein the state information indicates whether the defect is a continuous defect block or a single defect block.

7. The disc of claim 5, wherein:
    the state information indicates that the defect is a continuous defect block, and
    corresponding pointers for the defect and the replacement point out a start of the defect and a start of the replacement, respectively.

8. The disc of claim 5, wherein:
    the state information indicates that the defect is a continuous defect block, and
    corresponding pointers for the defect and the replacement point out an end of the defect and an end of the replacement, respectively.

9. A recording apparatus comprising:
    a recording/reading unit that records data on or reads data from a disc; and
    a controller that controls the recording/reading unit to repeatedly record defect information regarding data, which is recorded in a data area of the disc, as defect information in a defect management area (DMA) that is present at least one of a lead-in area or a lead-out area of the disc, and to repeatedly record management information for managing the defect information as defect management information in the DMA.

* * * * *